US011416419B2

(12) United States Patent
SeyedzadehDelcheh

(10) Patent No.: US 11,416,419 B2
(45) Date of Patent: Aug. 16, 2022

(54) METHOD AND APPARATUS FOR PROTECTING A MEMORY FROM A WRITE ATTACK

(71) Applicant: Advanced Micro Devices, Inc., Santa Clara, CA (US)

(72) Inventor: SeyedMohammad SeyedzadehDelcheh, Bellevue, WA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 46 days.

(21) Appl. No.: 17/129,786

(22) Filed: Dec. 21, 2020

(65) Prior Publication Data

US 2022/0197826 A1 Jun. 23, 2022

(51) Int. Cl.
*G06F 12/00* (2006.01)
*G06F 13/00* (2006.01)
*G06F 13/28* (2006.01)
*G06F 12/14* (2006.01)
*G06F 12/0895* (2016.01)
*G06F 21/55* (2013.01)

(52) U.S. Cl.
CPC ...... *G06F 12/1425* (2013.01); *G06F 12/0895* (2013.01); *G06F 21/552* (2013.01); *G06F 2212/1052* (2013.01); *G06F 2221/034* (2013.01)

(58) Field of Classification Search
CPC ............. G06F 12/1425; G06F 12/0895; G06F 21/552; G06F 2212/1052; G06F 2221/034
USPC ........................................................ 711/129
See application file for complete search history.

(56) References Cited

U.S. PATENT DOCUMENTS

2003/0206600 A1* 11/2003 Vankka .................. H04L 5/06
375/261
2016/0147598 A1* 5/2016 Muralimanohar .. G06F 11/1064
714/768
2019/0065307 A1* 2/2019 Lien .................. G06F 12/0246

OTHER PUBLICATIONS

IEEE search results (Year: 2022).*
Hewlitt, R., & Swartzlantler, E., "Canonical Signed Digit Representation for FIR Digital Filters", IEFF Workshop on Signal Processing Systems, SiPS 2000, 11 pgs., Oct. 2000.
Russo, U., et. al., "Modeling of Programming and Read Performance in Phase-Change Memories—Part II: Program Disturb and Mixed-Scaling Approach", IEEE Transactions on Electron Devices, vol. 55, No. 2, IEEE, 8 pgs., Feb. 2008.
Jiang, L., et. al., "Mitigating Write Disturbance in Super Dense Phase Change Memories", 44th Annual IEEE/IFIP International Conference on Dependable Systems and Networks, IEEE, 12 pgs., 2014.
Wang, R., et. al., "SD-PCM: Constructing Reliable Super Dense PCM Under Write Disturbance", ASPLOS '15, ACM, 13 pgs., Mar. 2015.

(Continued)

*Primary Examiner* — Edward J Dudek, Jr.
*Assistant Examiner* — Sidney Li
(74) *Attorney, Agent, or Firm* — Volpe Koenig

(57) ABSTRACT

A method and apparatus of protecting a memory from a write attack includes dividing a cacheline of memory into a plurality of sub-blocks. A codeword is generated from at least one sub-block of the plurality of sub-blocks and a complement of the at least one sub-block. One of the generated codewords is selected, wherein the selected codeword is used for storage in memory.

20 Claims, 6 Drawing Sheets

(56) References Cited

OTHER PUBLICATIONS

Choi, J., et. al., "DC-PCM: Mitigating PCM Write Disturbance with Low Performance Overhead by Using Detection Cells", IEEE Transactions on Computers, vol. 68, No. 12, IEEE, 14 pgs., Dec. 2019.
Swami, S., & Mohanram, K., "ADAM: Architecture for Write Disturbance Mitigation in Scaled Phase Change Memory". 2018 Design, Automation & Test in Europe Conference & Exhibition, IEEE, 6 pgs., Mar. 2018.
Zhou, P., et. al., "A Durable and Energy Efficient Main Memory Using Phase Change Memory Technology", ISCA 09, ACM, 10 pgs., Jun. 2009.
Jiang, L., et. al., "Improving Write Operations in MLC Phase Change Memory", IFFF International Symposium on High-Performance Comp Architecture, IEEE, 10 pgs., Feb. 2012.
Imran, M. et. al., "CEnT: An Efficient Architecture to Eliminate Intra-array Write Disturbance in PCM", IEEE Transactions on Computers, IEEE, 15 pgs., 2020.
Kim, J. S., et. al., "Revisiting RowHammer: An Experimental Analysis of Modern DRAM Devices and Mitigation Techniques", arXiv:2005.13121v2, arXiv, 15 pgs., May 29, 2020.
Tanaka, Y., Efficient Signed-Digit_to_Canonical-Signed-Digit Recoding Circuits, Microelectronics Journal 21-25, Elsevier Ltd., 6 pgs., 2016.

\* cited by examiner

METHOD AND APPARATUS FOR PROTECTING A MEMORY FROM A WRITE ATTACK

BACKGROUND

Since the advent of many core systems and memory intensive workloads, the demand for high memory capacity has increased very quickly. Technology scaling reduces the size and proximity of cells and compacts more cells in the same die area to achieve higher memory capacity. Unfortunately, this trend jeopardizes current main memory designs (e.g., dynamic random access memory (DRAM)), especially when scaling beyond 20 nm technology, because of fundamental obstacles related to high power consumption and process variation problems. Among several alternative technology candidates, Phase Change Memory (PCM) is emerging due to its desirable characteristics in terms of scalability, low access latency and negligible standby power. However, due to the nature of compactness of the physical circuitry on the memory, it is susceptible to malicious write attacks (e.g., rowhammer attacks) that can produce errors in the memory.

BRIEF DESCRIPTION OF THE DRAWINGS

A more detailed understanding can be had from the following description, given by way of example in conjunction with the accompanying drawings wherein.

DETAILED DESCRIPTION

Although the method and apparatus will be expanded upon in further detail below, briefly a method for and apparatus for protecting a memory from a write attack is described herein.

The method described herein is directed for the protection of deeply scaled Phase Change Memory (PCM) based main memory. Essentially, the heat resulting from resetting PCM cells disturbs the resistance states of neighboring cells, thereby opening a room for an adversary to intentionally reset cells and corrupt data.

A method of protecting a memory from a write attack includes dividing a cacheline of memory into a plurality of sub-blocks. A codeword is generated from at least one sub-block and a codeword is generated for a complement of the at least one sub-block. One of the generated codewords is selected, wherein the selected codeword is used for storage in memory.

An apparatus for protecting a memory from a write attack includes a memory, a memory controller operatively coupled with and in communication with the memory, and a processor operatively coupled with and in communication with the memory controller. The processor is configured to divide a cacheline stored in the memory into a plurality of sub-blocks, generate a codeword from at least one sub-block and generate a codeword for a complement of the at least one sub-block, and select one of the generated codewords, wherein the selected codeword is used for storage in memory.

A non-transitory computer-readable medium for protecting a memory from a write attack, the non-transitory computer-readable medium having instructions recorded thereon, that when executed by the processor, cause the processor to perform operations. The operations include dividing a cacheline of memory into a plurality of sub-blocks. A codeword is generated from at least one sub-block and a codeword is generated for a complement of the at least one sub-block. One of the generated codewords is selected, wherein the selected codeword is used for storage in memory.

Figure 1:
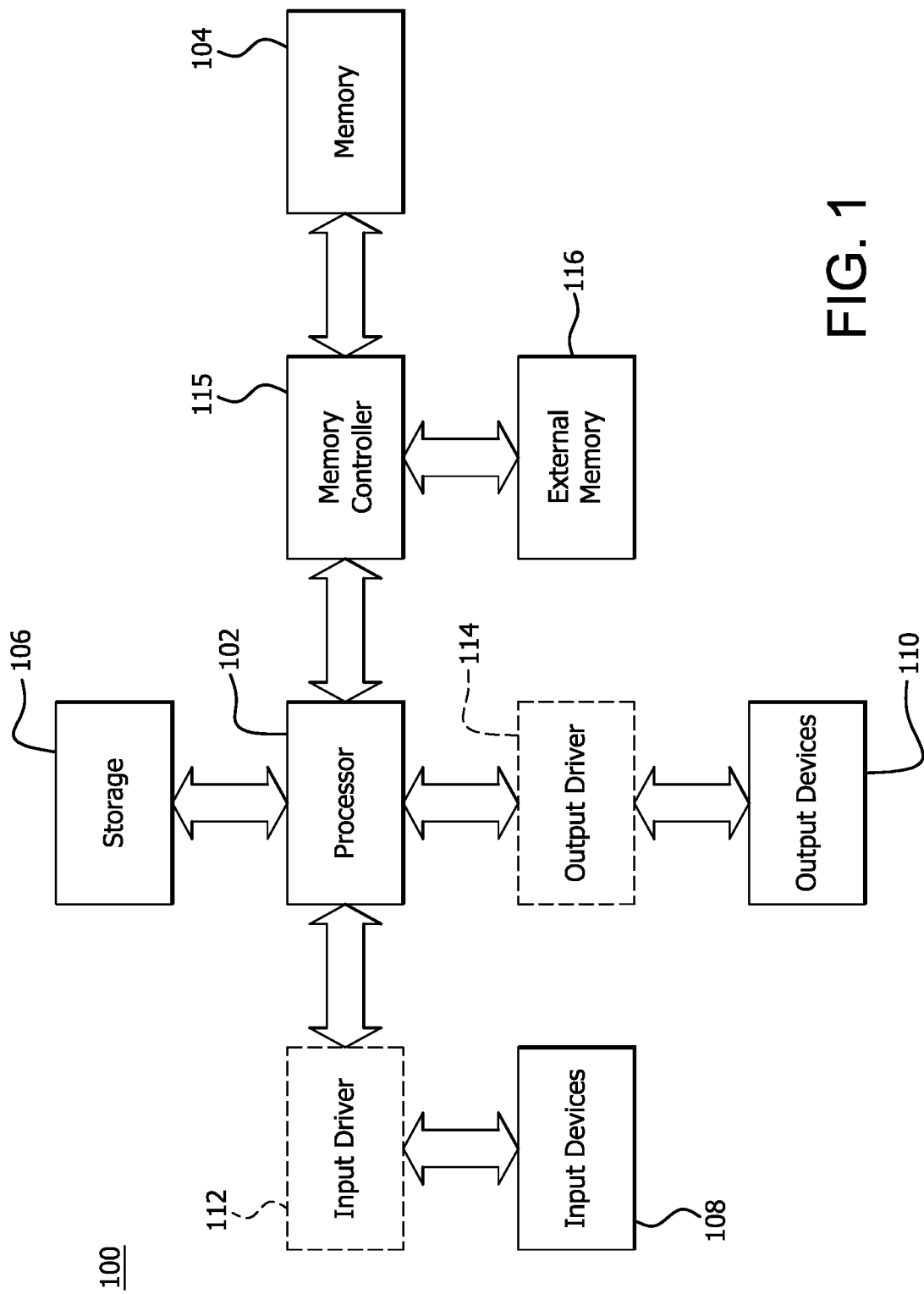
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a server, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. Additionally, the device 100 includes a memory controller 115 that communicates with the processor 102 and the memory 104, and also can communicate with an external memory 116. In some embodiments, memory controller 115 will be included within processor 102. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The external memory 116 may be similar to the memory 104, and may reside in the form of off-chip memory. Additionally, the external memory may be memory resident in a server where the memory controller 115 communicates over a network interface to access the memory 116.

Figure 2:
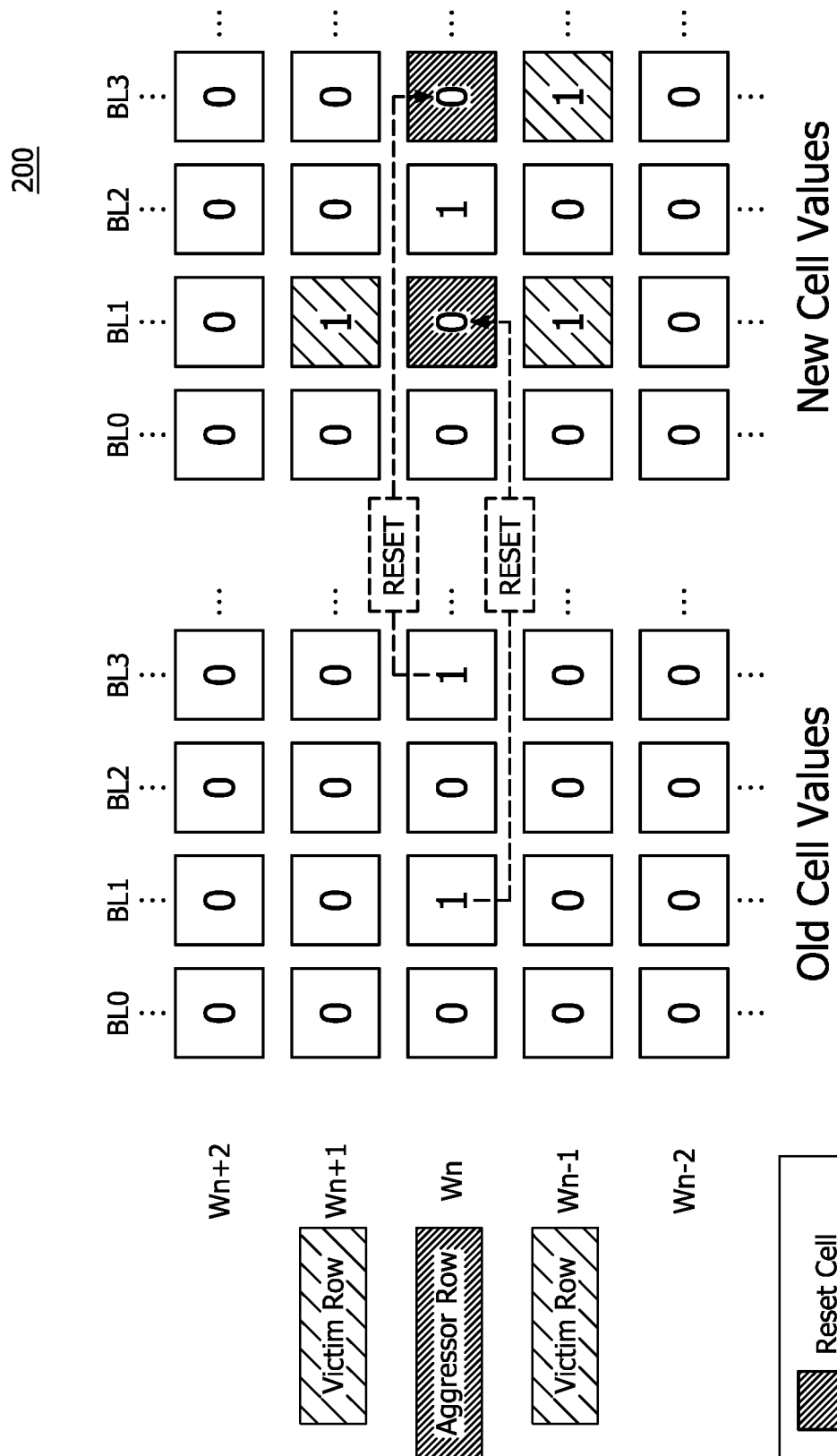
FIG. 2 is an example diagram of write disturbance errors in a memory.

FIG. 2 is an example diagram of write disturbance errors in a memory 200. Effectively, a single PCM cell is programed by switching the chalcogenide material between a high resistance amorphous state (RESET) and a low resistance crystalline state (SET) through the application of a programming current. The cell in the SET state requires a high intense programming current to change its status to the RESET state.

This current is considerably more than the current required for switching the cell from RESET to SET. Specifically, the reset process in deeply scaled PCM technology produces heat that easily reduces the resistance of neighboring cells, thereby disturbing cells.

Referring still to FIG. 2, the PCM cell states before and after reprogramming the memory-line '$W_n$' are shown. In this example, only 5 word-lines ($W_{n-2}$, $W_{n-1}$, $W_n$, $W_{n+1}$, $W_{n+2}$) and 4 bit-lines ($BL_0$, $BL_1$, $BL_2$, $BL_3$) are shown. While the heat resulting from setting cells ($W_n,BL_0$) and ($W_n,BL_2$) during the programming process is negligible, the heat resulting from resetting cells ($W_n,BL_1$) and ($W_n,BL_3$) reduces considerably the resistance of existing cells in '$W_{n+1}$' and '$W_{n-1}$' and disturbs some cells, e.g. ($W_{n+1},BL_1$), ($W_{n-1}, BL_3$), ($W_{n+1}, BL_3$) and ($W_{n-1},BL_3$). Although the cells described as being disturbed are presented as examples, it is understood that any combination of the cells indicated may be disturbed.

Since heat only reduces the resistance of cells, the state of cells only changes from the RESET state to the SET state. Thus, the write disturbance error is a unidirectional. Note that because of uni-directionality write disturbance errors (RESET (0) to SET (1)), disturbed cells in '$W_{n+1}$' and '$W_{n-1}$' never disturb cells of the neighboring word-lines '$W_{n+2}$' and '$W_{n-2}$', respectively.

Figure 3:
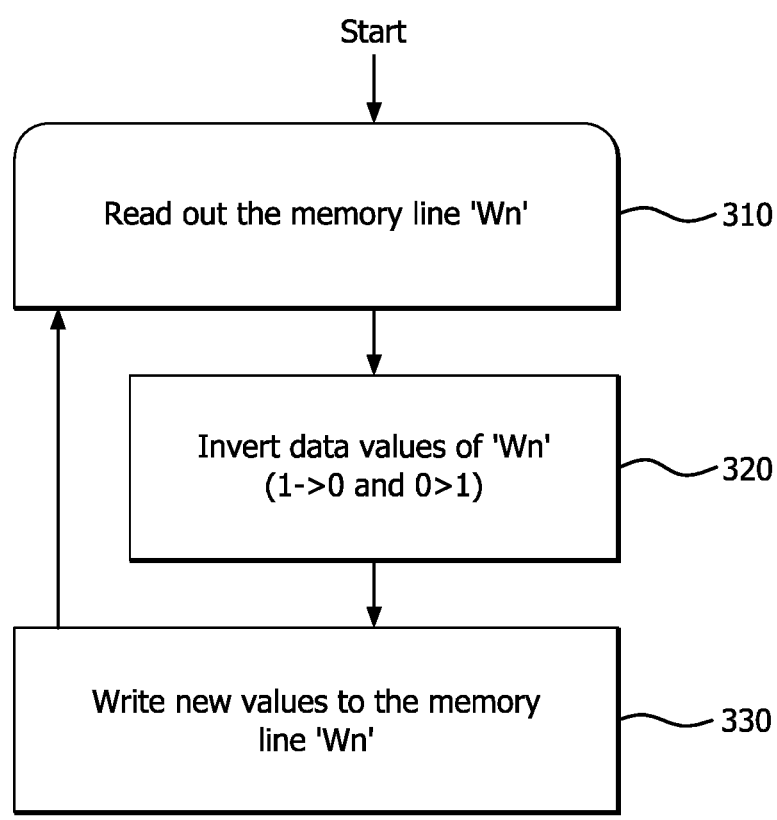
FIG. 3 is an example flow diagram of a write attack in memory.

Since the write disturbance error rate is high along bit-lines, updating cells of the aggressor word-line with data patterns that impose many reset operations in the aggressor word-line easily disturbs cells in the victim word-lines. FIG. 3 is an example flow diagram 300 of a write attack in memory.

In step 310, a memory line (Wn) is read out. This would be the content of an aggressor word line being read out. The data values of the memory line are then inverted (step 320).

For example, the read content of the word line is inverted via XORing with a bit mask (e.g., M='111 . . . 111'). In this case, each cell in the SET state switches to the RESET state and vice versa.

The new values are then written to the memory line (Wn), (step 330). Since each cell can be in the state of either '0' or '1', twice repeating the steps 310-330 may be enough to reset at least once all cells in the aggressor word-line while the original cells remain unchanged. That is, $W_n=((W_n$ XOR M) XOR M). Because of high write disturbance bit-line error rates, applying the write kernel frequently may impose many errors in the victim word-lines. Since each word-line has a limited error correction capability, the error correction code (ECC) is not able to detect all errors; thus, uncorrectable write disturbance errors in the victim word-lines occur.

As described above, PCM is a promising technology due to its desirable characteristics in terms of scalability and negligible standby power. Unfortunately, heat resulting from resetting PCM cells reduces the resistance of neighboring cells and disturbs the resistance states of neighboring cells, thereby opening a room for the adversary to intentionally reset cells and corrupt data.

Canonical sign digit (CSD) encoding can be used to eliminate intra-word line write disturbance errors in MLC PCM via mapping binary digits to ternary digits. However, multi-level PCM cells are more vulnerable to write disturbance errors because of having the intermediate state.

Accordingly, it may be desirable to mitigate inter-word line write disturbance errors. This mitigation may be performed via generating multiple ternary code words and selecting the code word that minimizes likelihood incidence of errors in the neighboring rows of the accessed row.

A feature of CSD encoding is that adjacent canonical sign digits are never both non-zero, i.e. $T_i \times T_{i+1}=0$ where 'T' and 'i' are a ternary digit and the digit index, respectively. At least one of adjacent digits is always zero in the ternary stream. Specifically, if 0s are considered as SET states as well as is and −1s as RESET and intermediate states, resetting a cell never disturbs its adjacent cells because adjacent cells are in the SET states that have the minimum resistance.

To mitigate inter-word line write disturbance errors, the original binary stream and its complement to generate two distinct ternary streams and then selecting the ternary candidate that minimizes likelihood of incidence of inter-word line disturbance errors while eliminating intra-word line disturbance errors is utilized. The CSD encoding serially encodes the binary stream and uses only one carry bit to retrieve the original binary stream. Since the CSD decoding latency is much less than the main memory read access latency, system performance is preserved.

The following describes the use of CSD to eliminate write disturbance errors. To eliminate intra-word line write disturbance errors, CSD encoding to convert an n-bit binary stream $b_0 b_1 \ldots b_{x-1} b_x b_{x+1} \ldots b_{n-2} b_{n-1}$ to an n+1 ternary digit stream $t_0 t_1 \ldots t_{x-1} t_x t_{x+1} \ldots t_{n-2} t_{n-1} t_n$ where $b_i \in \{0,1\}$, $0 \le i \le n-1$ and $t_j \in \{0, +1, -1\}$, $0 \le j \le n$.

Again, as mentioned above, in CSD encoding, adjacent canonical sign digits are never both non-zero i.e. $t_i \times t_{i+1}=0$ where t and i are a ternary digit and the digit index, respectively. It means that at least one of adjacent digits is always zero in the ternary stream. Therefore, if we consider 0s as SET states as well as is and −1s as RESET and intermediate states, resetting a cell never disturb its adjacent cells because adjacent cells are in the SET states that have the minimum resistance. The following paragraph expatiates how writing ternary streams in MLC PCM does not produce intra-word line write disturbance errors.

According to the CSD encoding feature, any three consecutive ternary digits $\{t_{i-1} t_i t_{i+1}\}$ can be represented as either $\{t_{i-1} 0 t_{i+1}\}$ or $\{0 t_i 0\}$. Since the PCM memory uses a differential write technique to reduce write energy, the new ternary digits are compared with old ternary digits before being written into the memory. Thus, four different cases happen when three consecutive ternary digits are compared with the three consecutive old ternary digits as follows. Note that 0s represent SET states.

Case1: $\{t_{i-1}^{old} 0 t_{i+1}^{old}\} \xrightarrow{after\ a\ new\ write} \{t_{i-1}^{new} 0 t_{i+1}^{new}\}$: If $t_{i-1}^{new} \ne t_{i-1}^{old}$, heat resulting from resetting $t_{i-1}^{old}$ does not disturb $t_i^{new}$ because it is in the SET state. Also, If $t_{i+1}^{new} \ne t_{i+1}^{old}$, heat resulting from resetting $t_{i+1}^{old}$ does not disturb $t_i^{new}$ because it is in the SET state. Note that $t_i^{new}=0$ represents the SET state.

Case2: $\{0\ t_i^{old}\ 0\} \xrightarrow{after\ a\ new\ write} \{t_{i-1}^{new}\ 0\ t_{i+1}^{new}\}$: Since $t_i^{nriew}=0$, it is in the SET state and heat resulting from resetting $t_{i\pm 1}^{old}$ does not disturb it.

Case3: $\{t_{i-1}^{old}\ 0\ t_{i+1}^{old}\} \xrightarrow{after\ a\ new\ write} \{0\ t_i^{new}\ 0\}$: Since $t_{i\pm1}^{new}$ are in the SET states after the new write, heat resulting from resetting $t_{ir}^{old}$ does not disturb them. Note that $t_i^{old}=0$ represents the SET state.

Case4: $\{0\ t_i^{old}\ 0\} \xrightarrow{after\ a\ new\ write} \{0\ t_i^{new}\ 0\}$: Since $t_{i\pm1}^{new}$ are in the SET states, heat resulting from resetting $t_{ir}^{old}$ does not disturb them.

However, heat from resetting a cell can disturb cells in the neighboring word line that are in the RESET or intermediate states. Accordingly, CSD encoding may be utilized to mitigate inter-word line write disturbance errors.

Figure 4A:
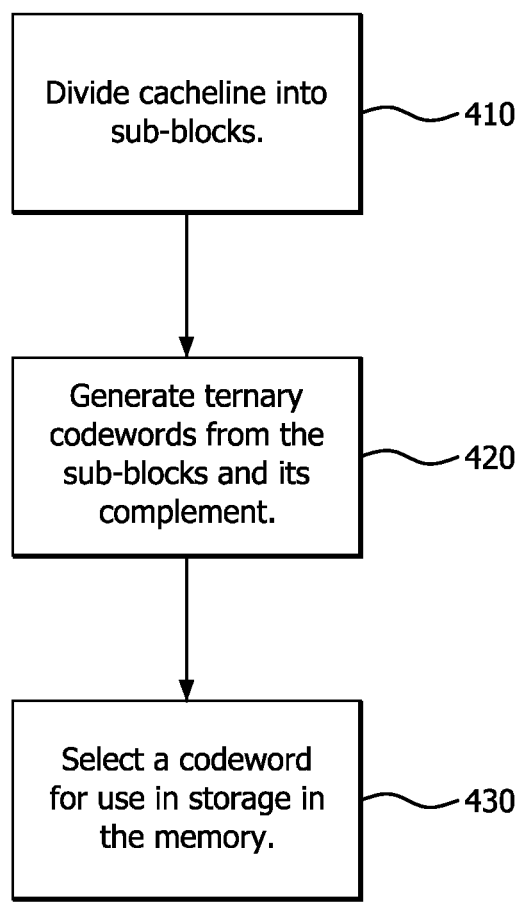
FIGS. 4A and 4B are flow diagrams of example methods of protecting a memory from a write attack in accordance with an embodiment.
Figure 4B:
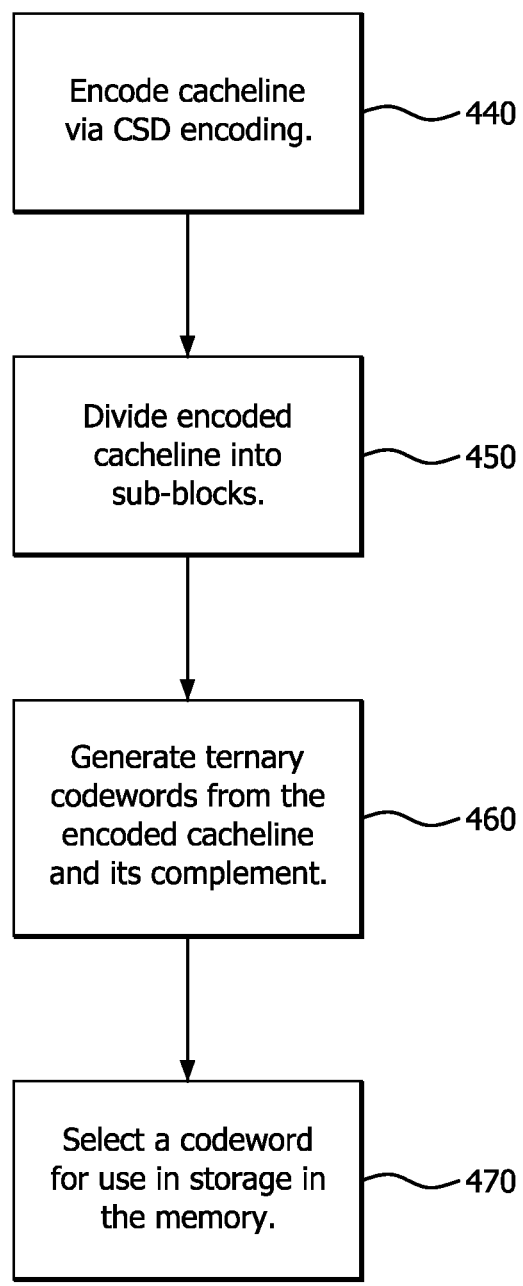

FIGS. 4A and 4B are flow diagrams of example methods of protecting a memory from a write attack in accordance with an embodiment. In FIG. 4A, cachelines are divided into sub-blocks where ternary codewords are generated from the sub-blocks and the complements of the sub-blocks. In FIG. 4B, the cachelines are encoding via CSD encoding prior to being divided.

That is, in FIG. 4A, in example method 400A, a cacheline is divided into sub-blocks (step 410). For example, an n-bit cacheline is divided into N sub-blocks where each sub-block is n/N bits. That is, if there are 64 bits in the cacheline, 4 sub-blocks of 16 bits each may be created, for example.

Two ternary codewords are then generated from each sub-block and its complement as to 0s and 0s to 1s) in step 420. In step 430, codewords are selected for use in storage in the memory. For example, the codewords are select to minimize the number of resets, which is described in more detail below.

For example, the selection of ternary codewords for each sub-block is made by selecting those sub-blocks from both the original sub-blocks and their complements that provide the least number of resets when compared to other generated codewords. That is, if sub-block 1, for example minimizes resets when compared to the complement of sub-block 1, and the complement of sub-block 2 minimizes resets when compared to sub-block 2, those sub-blocks are selected. This comparison is performed across all the sub-blocks.

Once the codeword sub-blocks that minimize the number of resets are selected, they are compared against a threshold number of resets. If the number of resets is greater than the threshold, the neighboring row is also read during the operation. However, if the number of resets is less than the threshold, the neighboring row is not read.

In FIG. 4B, in example method 400B, a cacheline is encoded via CSD encoding (step 440). That is, each n-bit cacheline has CSD encoding performed. Once the cacheline is encoded, the encoded cacheline is divided into N sub-blocks, where each sub-block is n/N bits (step 450). In this case, the last sub-block includes 1+n/N bits because it includes the carry bit of the CSD conversion.

In step 460 the ternary codewords are generated from the CSD encoded codewords and its complement as to 0s and 0s to 1s). Similar to step 430 of example method 400A, in step 470 of example method 400B, codewords are selected for use in storage in the memory.

That is, again, in step 470, the selecting of the ternary codewords across the sub-blocks is utilized to minimize the number of resets.

For example, the selection of ternary codewords for each sub-block is made by selecting those sub-blocks from both the original sub-blocks and their complements that provide the least number of resets. That is, if sub-block 1, for example minimizes resets when compared to the complement of sub-block 1, and the complement of sub-block 2 minimizes resets when compared to sub-block 2, those sub-blocks are selected. This comparison is performed across all the sub-blocks.

Once the codeword sub-blocks that minimize the number of resets are selected, they are compared against a threshold number of resets. If the number of resets is greater than the threshold, the neighboring row is also read during the operation. However, if the number of resets is less than the threshold, the neighboring row is not read.

Figure 5:
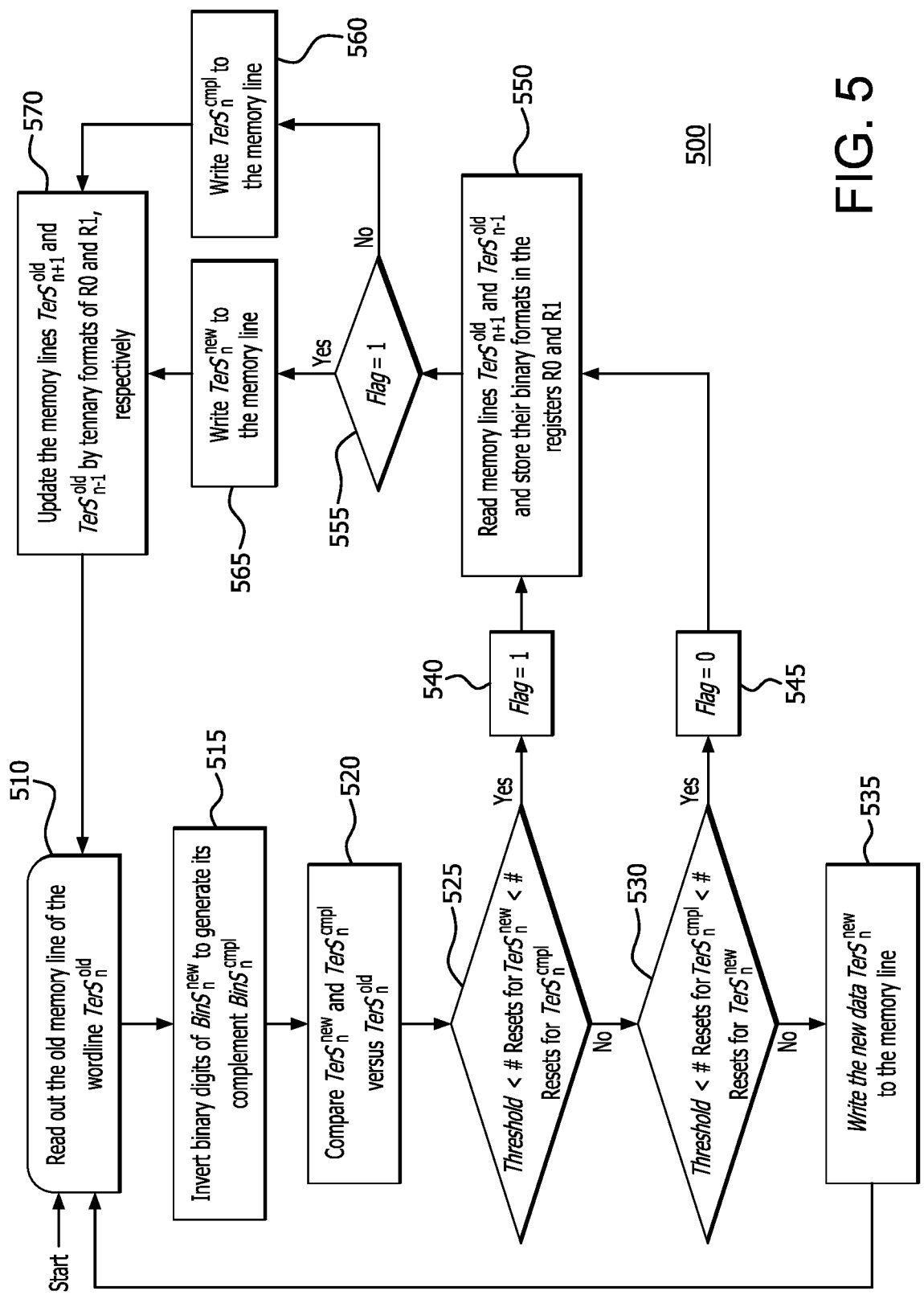
FIG. 5 is a flow diagram of an example method of protecting a memory from a write attack in accordance with another embodiment.

FIG. 5 is a flow diagram of an example method 500 of protecting a memory from a write attack in accordance with another embodiment. Referring now to FIG. 5, as well as to the description above in FIGS. 2-4B, in step 510, an old memory line of the word line $TerS_n^{old}$ is read out.

The binary digits of the original binary stream $BinS_n^{new}$ are inverted to generate its complement $BinS_n^{cmpl}$ (step 515). CSD encoding is used to encode $BinS_n^{new}$ and $BinS_n^{cmpl}$ and to generate two ternary streams $TerS_n^{new}$ and $TerS_n^{cmpl}$, respectively.

In step 520, the ternary digits of $TerS_n^{new}$ and $TerS_n^{cmpl}$ are compared with $TerS_n^{old}$ and the number of resets required is counted by each new ternary stream for being written into the word line. If the number of resets of $TerS_n^{new}$ and the number of resets of $TerS_n^{cmpl}$ are smaller than an uncorrectable error threshold (i.e., the answer to steps 525 and 530 are both "no"), the new ternary stream $TerS_n^{new}$ or $TerS_n^{cmpl}$ are written into the memory line (step 535).

If the number of resets of $TerS_n^{new}$ is greater than the uncorrectable error threshold and smaller than those of $TerS_n^{cmpl}$, (i.e., the answer to step 525 is "yes"), then a flag is set (e.g., set to "1") in step 540, otherwise the method proceeds to step 530, where if the number of resets of $TerS_n^{cmpl}$ is greater than the uncorrectable error threshold and smaller than those of $TerS_n^{cmpl}$, (i.e., the answer to step 530 is "yes"), than the flag is reset (e.g., set to "0") in step 545.

Upon setting (step 540) or resetting (step 545) the flag, the method proceeds to step 550. In step 550, the memory lines $TerS_{n+1}^{old}$ and $TerS_{n-1}^{old}$ are read and their binary formats are stored in the registers R0 and R1.

If the flag is 0 (step 555), $TerS_n^{cmpl}$ is written to the memory line (step 560). If the flag is equal to 1 (step 555), $TerS_n^{new}$ is written to the memory line (step 565).

At that point, the memory lines $TerS_{n+1}^{old}$ and $TerS_{n-1}^{old}$ are updated by the ternary formats of registers R0 and R1, respectively (step 570).

Additionally, the auxiliary digit created above may be used by a CSD decoder to determine which ternary stream (original stream or its complement) has been used in the encoding process to minimize the number of resets.

The methods provided can be implemented in a general purpose computer, a processor, or a processor core. Suitable processors include, by way of example, a general purpose processor, a purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure. Further, although the methods and apparatus described above are described in the context of controlling and configuring PCIe links and ports, the methods and apparatus may be utilized in any interconnect protocol where link width is negotiated.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). For example, the methods described above may be implemented in the processor 102 or on any other processor in the computer system 100.

It should be noted that although the examples provided above refer to two virtual machines for example purposes, any number of virtual machines can be created for application execution.

What is claimed is:

1. A method of protecting a memory from a write attack, comprising:
   dividing a cacheline of memory into a plurality of sub-blocks;
   generating a codeword from at least one sub-block and a codeword from a complement of the at least one sub-block; and
   selecting one of the generated codewords, wherein the selected codeword is used for storage in memory.

2. The method of claim 1, further comprising encoding the cacheline of memory prior to dividing the cacheline into the plurality of sub-blocks.

3. The method of claim 2 wherein the encoding is canonical sign digit (CSD) encoding.

4. The method of claim 1 wherein the codeword for the at least one sub-block and the codeword for the complement of the at least one sub-block is generated by converting a binary stream of data in each sub-block to a respective ternary stream of data.

5. The method of claim 4, further comprising using canonical sign digit (CSD) encoding to convert each binary stream of data to the respective ternary stream of data.

6. The method of claim 1 wherein the selected one of the generated codewords minimizes a number of resets by providing a least number of resets.

7. The method of claim 6 wherein selecting the codewords to provide a least number of resets includes comparing a number of resets from the codeword generated from an original sub-block and the codeword generated from the respective complement of that sub-block and selecting the codeword for that sub-block that provides the least number of resets.

8. The method of claim 7, further comprising comparing the least number of resets against a threshold.

9. The method of claim 8 wherein if the least number of resets exceeds the threshold, a neighboring row of data is read.

10. The method of claim 8 wherein if the least number of resets is less than the threshold, a neighboring row is not read.

11. An apparatus for protecting a memory from a write attack, comprising:
    a memory;
    a memory controller operatively coupled with and in communication with the memory; and
    a processor operatively coupled with and in communication with the memory controller, the processor configured to divide a cacheline stored in the memory into a plurality of sub-blocks, generate a codeword from at least one sub-block and a codeword from a complement of the at least one sub-block, and select one of the generated codewords, wherein the selected codeword is used for storage in memory.

12. The apparatus of claim 11, further comprising the processor encoding the cacheline of memory prior to dividing the cacheline into the plurality of sub-blocks.

13. The apparatus of claim 12 wherein the encoding is canonical sign digit (CSD) encoding.

14. The apparatus of claim 11 wherein the codeword for the at least one sub-block and the codeword for the complement of the at least one sub-block is generated by converting a binary stream of data in each sub-block to a respective ternary stream of data.

15. The apparatus of claim 14, further comprising the processor using canonical sign digit (CSD) encoding to convert each binary stream of data to the respective ternary stream of data.

16. The apparatus of claim 11 wherein the processor minimizes a number of resets by selecting the generated codeword that provides a least number of resets.

17. The apparatus of claim 16 wherein selecting the codewords to provide a least number of resets includes the processor comparing a number of resets from the codeword generated from an original sub-block and the respective codeword generated from the complement of that sub-block and selecting the codeword for that sub-block that provides the least number of resets.

18. The apparatus of claim 17, further comprising the processor comparing the least number of resets against a threshold.

19. The apparatus of claim 18 wherein if the least number of resets exceeds the threshold, the processor reads a neighboring row.

20. A non-transitory computer-readable medium for protecting a memory from a write attack, the non-transitory computer-readable medium having instructions recorded thereon, that when executed by the processor, cause the processor to perform operations including:
    dividing a cacheline of memory into a plurality of sub-blocks;
    generating a codeword from at least one sub-block and a codeword from a complement of the at least one sub-block; and
    selecting one of the generated codewords, wherein the selected codeword is used for storage in memory.

* * * * *